May 23, 1950     B. CHANCE     2,508,565
ELECTRICAL NAVIGATION SYSTEM
Filed Sept. 21, 1945     3 Sheets-Sheet 1
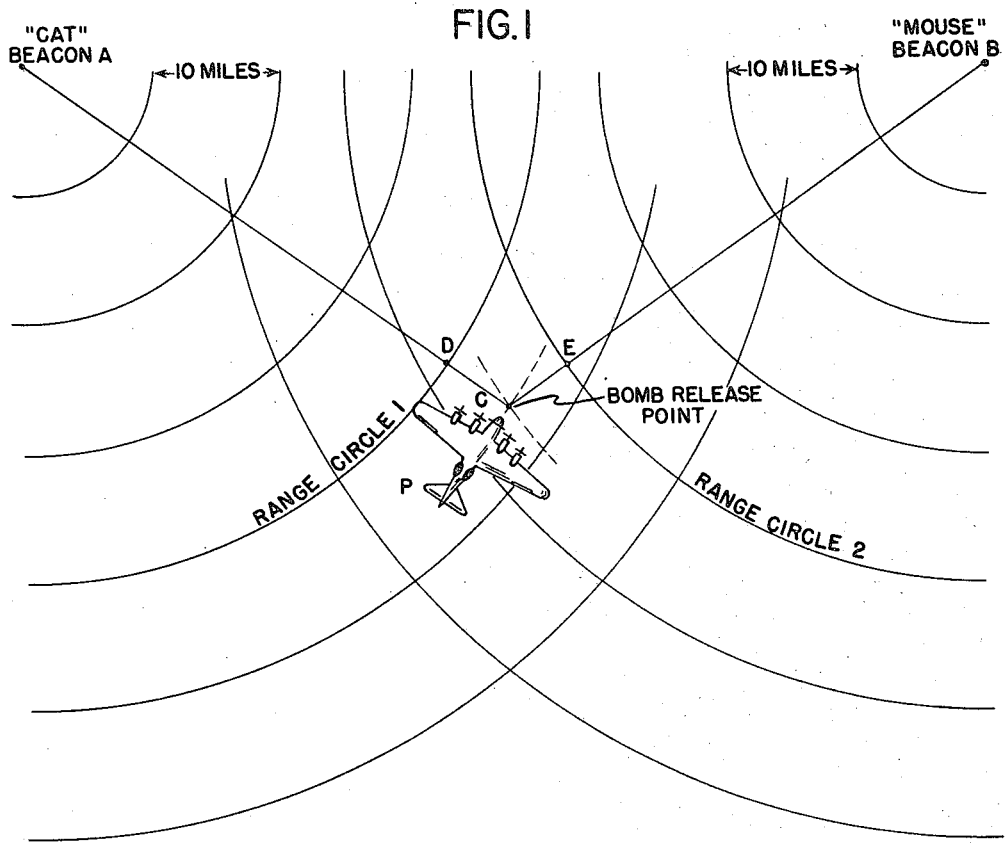
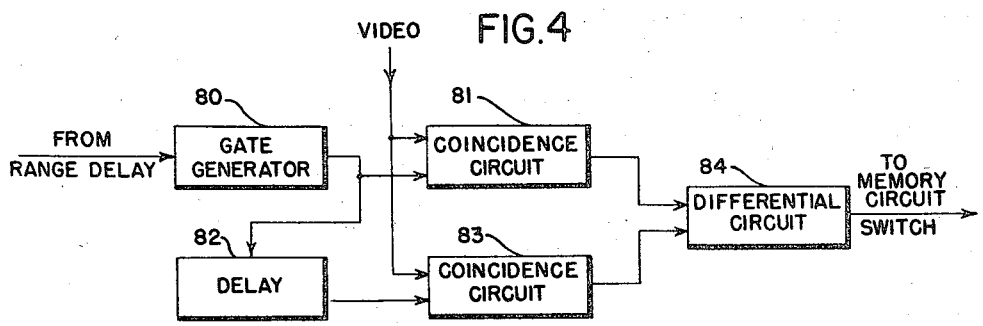
INVENTOR.
BRITTON CHANCE
BY
ATTORNEY

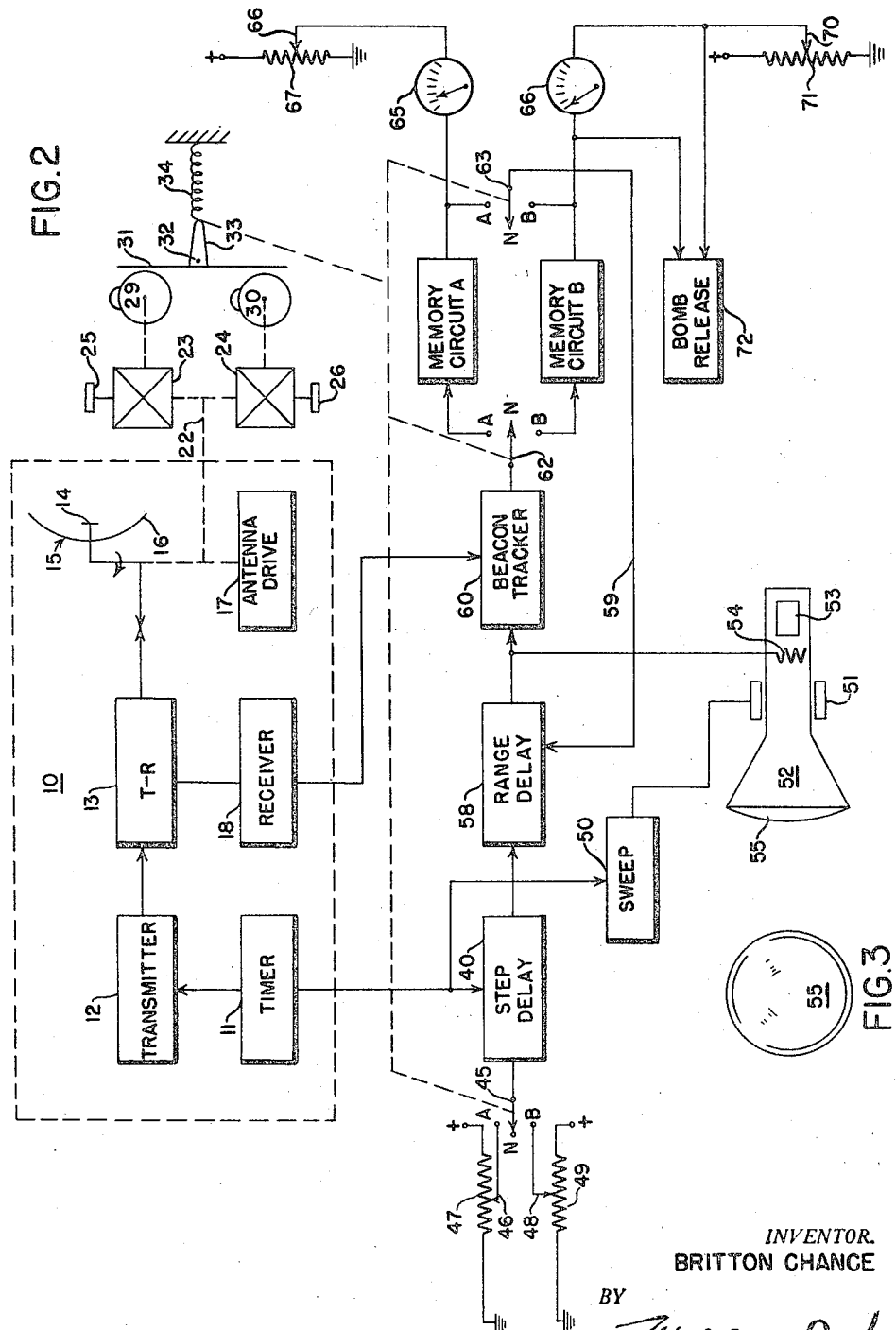

May 23, 1950     B. CHANCE     2,508,565
ELECTRICAL NAVIGATION SYSTEM
Filed Sept. 21, 1945     3 Sheets—Sheet 3

*INVENTOR.*
BRITTON CHANCE
BY
*William D. Hall*
ATTORNEY

Patented May 23, 1950

2,508,565

UNITED STATES PATENT OFFICE 2,508,565

ELECTRICAL NAVIGATION SYSTEM

Britton Chance, Cambridge, Mass., assignor, by mesne assignments, to the United States of America as represented by the Secretary of War Application September 21, 1945, Serial No. 617,873

10 Claims. (Cl. 343—15)

This invention relates to an electrical navigation system and more particularly to a means for simultaneously tracking a plurality of responding radio beacons.

One method of navigating an aircraft includes the determination of the distance between the aircraft and a radio beacon having a known position. The beacon may be of the type which, when interrogated by a pulse of electromagnetic energy transmitted by the radio object detection apparatus carried by the aircraft, responds with a reply. The response of the beacon may be a series of pulses uniquely coded to distinguish it from other responding beacons. The time elapsing between the transmission of the interrogating pulse from the aircraft and the receipt by the aircraft of the beacon response is a measure of the distance from the aircraft to the beacon.

The aircraft may carry apparatus capable of being set to track a preselected beacon and producing a continuous measure of the range of the beacon from the aircraft. As used herein the term "tracking a beacon" denotes the operation of producing a voltage the magnitude of which is proportional to the instantaneous range from the aircraft to the beacon. If the range from the aircraft of two beacons having known positions is determined, the position of the aircraft may be established.

It is an object of this invention to provide an apparatus for simultaneously tracking a plurality of beacons. It is a further object to provide means for tracking a plurality of beacons whereby at least some of the tracking components are used in the tracking of each beacon.

Other objects, features, and advantages of this invention will suggest themselves to those skilled in the art and will become apparent from the following description of the invention taken in connection with the accompanying drawing in which:

Fig. 1 is a diagram used in explaining the principles of beacon navigation;

Fig. 2 is a block diagram of a navigation system involving the principles of this invention;

Fig. 3 shows the viewing screen of the indicator tube in Fig. 2;

Fig. 4 is a block diagram of one form of beacon tracker circuit;

Figure 5:
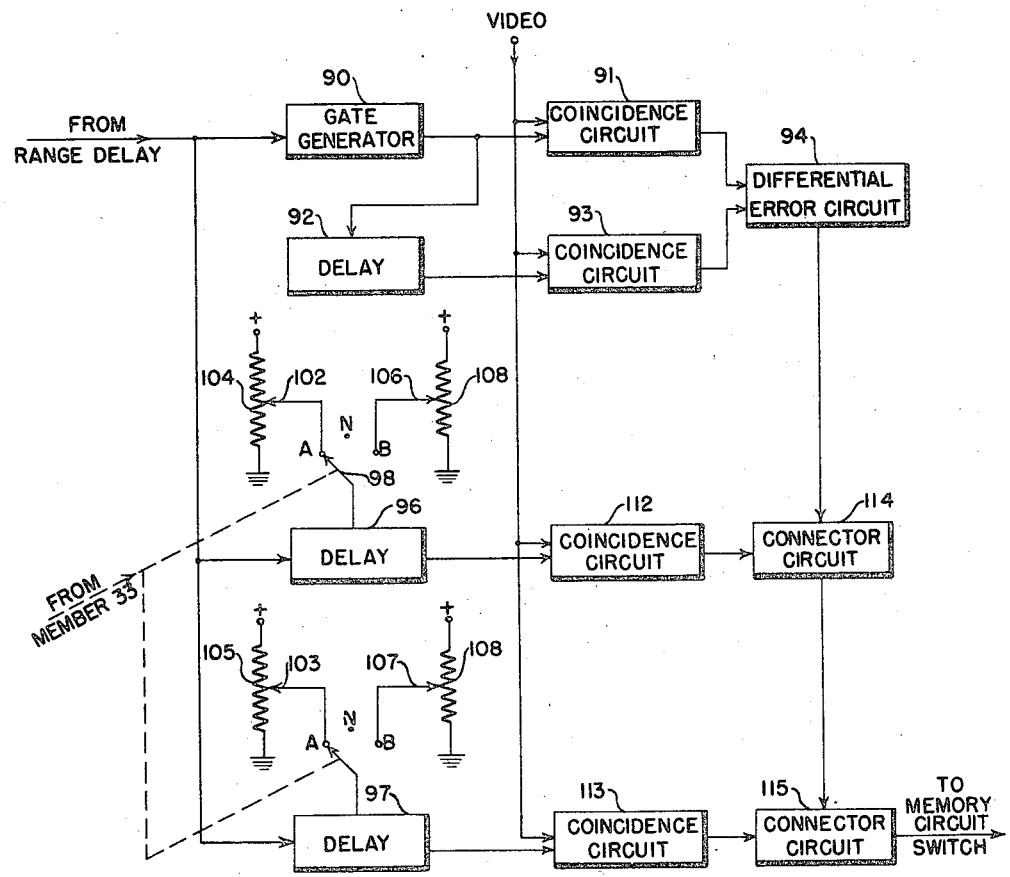
Fig. 5 is a block diagram showing an alternative form of a beacon tracker circuit.

Referring now more particularly to Fig. 1 for an explanation of navigation and bombing methods, radio responder beacons are designated as beacons A and B while C is the point to which the aircraft P is to be accurately navigated. If bombs are to be dropped, point C becomes the bomb release point and is determined from the position of the target, by predetermining the altitude, speed, and heading of the aircraft at the bomb release point, and by predicting the wind velocity and direction.

One method by which the aircraft may accurately navigate to the bomb release point is by flying at a constant distance from one beacon, known as the cat beacon, and shown as A in Fig. 1. The bombs are released when the aircraft arrives at the proper distance from beacon B, known as the mouse beacon.

When the cat and mouse bombing approach is used, voltages may be produced each of which is proportional to the range from the aircraft to one beacon. These voltages may each be compared with a fixed voltage preset to a value corresponding to the range of destination, or bomb release point, to one of the beacons.

If a voltage corresponding to the entire range to a beacon, such as A—C in Fig. 1, is used for comparison with a fixed voltage, the percentage variation of the changing range voltage is small and it is difficult to make the comparison with a high degree of precision. It is therefore more satisfactory if the range of the aircraft is tracked with respect to a fixed range circle such as range circles 1 or 2 designated in Fig. 1. Voltages corresponding to the ranges of the aircraft to range circles 1 and 2 are therefore compared with voltages corresponding to the distances C—D and C—E. The percentage variation of the changing range voltages is then high and the comparison with the fixed voltages may be readily made with precision.

Referring now more particularly to Fig. 2, radio object detection apparatus 10 includes timer 11 controlling the operation of transmitter 12 which is connected through transmit-receive (T-R) switch 13 to radiating element 14 of antenna 15. Timer 11 is preferably a circuit capable of producing short sharp voltage pulses at accurately spaced intervals of time. Antenna 15 also includes reflecting element 16 and is rotated about a vertical axis by antenna drive mechanism 17. T-R switch 13 is also connected to receiver 18. An indication of antenna rotation is transmitted as indicated by dotted line 22 to differential gear assemblies 23 and 24, provided with adjusting knobs 25 and 26 respectively. The output of differential 23 drives cam 29 while the output of differential 24 drives cam 30. Cams 29 and 30 both act upon cam follower 31 pivoted at point 32 and held in a neutral position by member 33 and the tension of spring 34. Follower 31 may be slightly flexible so as not to break if, during adjustment, it is simultaneously forced in opposite directions by cams 29 and 30.

Timer 11 is also connected to provide a reference pulse to step delay circuit 40 which may be any circuit capable of delaying the reference pulses from timer 11 by predetermined steps. One circuit that is well adapted for use as a step delay circuit is a uni-stable multivibrator circuit. It is well known that this type of multivibrator will produce a voltage pulse starting at the time an input pulse is applied to a control element of the multivibrator. It is also well known that the time width of the pulse produced by a uni-stable multivibrator may be made proportional to the steady bias voltage applied to the same or another control element. This pulse generated by the multivibrator may be differentiated so that a short, sharp output pulse occurs in time coincidence with the trailing edge of the pulse generated by the multivibrator. If the bias voltage applied to the multivibrator in discreet steps the interval of time between the time the input pulse is applied and the time the sharp output pulse is generated will vary in discreet steps or discreet intervals of time. It will be convenient in analyzing the operation of this circuit to speak of the output pulse from the multivibrator as a delayed reference pulse. The delayed reference pulse is fed to range delay circuit 58. Range delay circuit 58 may be a second uni-stable multivibrator circuit similar to the one described above. However, range delay circuit 58 differs from circuit 40 in that the bias voltage applied to circuit 58 is continuously variable rather than being variable in steps as was the case in circuit 40. The continuously variable bias voltage permits circuit 58 to produce a continuously variable time delay. Step delay circuit 40 is provided with a switch 45 having an upper position "A," lower position "B," and middle neutral position "N." Switch 45 in the "A" position makes contact with the contactor 46 of potentiometer 47 connected between a source of positive potential and ground. In the "B" position, switch 45 makes contact with contactor 48 of potentiometer 49 connected between a source of positive potential and ground. Contactors 46 and 48 are adjustable along their respective potentiometers in steps. Since the pulse repetition rate of timer 11 is high compared to the switching rate of switch 45 the delay introduced by circuit 40 when switch 45 is in the "A" position will be determined by the bias supplied by potentiometer 47. When switch 45 moves to the "B" position the delay introduced by circuit 40 will be that determined by potentiometer 49.

Timer 11 is also connected to sweep generator 50, the output of which is connected to the deflecting coils 51 of cathode ray indicator tube 52. Tube 52 also contains electron gun 53, control grid 54, and fluorescent screen 55.

As stated above, range delay circuit 58 may be any circuit capable of adding a controlled delay to the pulse received from step delay circuit 40. Again, the pulse produced by circuit 58 could be differentiated to produce a sharp pulse at the trailing edge of the multivibrator pulse.

The delayed pulse provided in the output of range delay circuit 58 is applied to control grid 54 of indicator tube 52 and also to beacon tracker circuit 60. Beacon tracker circuit 60 is also provided with the output of receiver 18 to provide an index pulse and may be any circuit capable of comparing the beacon response or index pulse from receiver 18 with the delayed reference pulse from range delay circuit 58 and producing a voltage proportional to the time difference in the occurrence of the two pulses. The output voltage of beacon tracker 18 must have one polarity if the reference pulse occurs before the beacon response and the opposite polarity if the reference pulse occurs after the beacon response. Beacon tracker circuit 60 will be more fully described below with reference to Figs. 4 and 5.

Beacon tracker circuit 60 is provided with a switch 62 having upper position "A," lower position "B," and middle neutral position "N." In the upper position "A," switch 62 makes contact with memory circuit A. Memory circuit A may be any circuit capable of receiving the error voltage from beacon tracker circuit 60 and producing a continuing voltage indicative of the elapsed time between the interrogating pulse and the received response, and hence indicative of the range from the aircraft to the beacon. The output voltage of memory circuit A also varies in magnitude in accordance with the rate of variation in range between the aircraft and beacon. In position "B," switch 62 connects beacon tracker 60 with memory circuit B which is constructed in the same manner as memory circuit A. Switch 63 having upper position "A," lower position "B," and middle neutral position "N" is provided to connect line 59 to the output of either memory circuit A or memory circuit B.

Memory circuits A and B which will presently be described in connection with Figure 6 may be constructed in the manner disclosed for the memory circuit in the application by Andrew B. Jacobsen, Serial No. 584,233, entitled "Electrical circuit," filed March 22, 1945.

Memory circuits A and B are more fully described in connection with the description of Fig. 6 below.

The output of memory circuit A may be compared by meter 65 to a voltage picked up by adjustable contactor 66. Contactor 66 is adjustable along potentiometer 67 connected between a source of positive potential and ground. The output of memory circuit B is compared by meter 68 with a voltage picked up by contactor 70. Contactor 70 is adjustable along potentiometer 71 connected between a source of positive potential and ground. Bomb release circuit 72 receives an input from memory circuit B and contactor 70. Circuit 72 may be any circuit capable of releasing a bomb, as by energizing or deenergizing a relay, when the voltage output of memory circuit B is equal to the voltage picked up by contactor 70. Since relays and relay circuits that operate on a very small differential between two applied voltages are very well known it is not considered necessary to further describe circuit 72. However, if it is desired to construct a bomb release circuit that is well adapted for use with applicant's invention reference should be had to the copending application of Richard K. Mosher, Serial No. 598,164, entitled, Electrical apparatus, filed June 7, 1945.

In the operation of the apparatus set forth in Fig. 2, timer 11 controls the operation of transmitter 12 so that the latter produces a series of equally spaced radio frequency pulses which are transmitted through T-R switch 13 to antenna 15. Radiating element 14 and reflector 16 cooperate to produce a narrow directional beam of radio frequency pulses. Antenna 15 is rotated about a vertical axis by antenna drive 17. Any radio responder beacons intercepting the search pulses sent out by antenna 15 will respond by transmitting a non-directional reply. Any reply received by antenna 15 will be fed through T-R switch 13 to receiver 18. T-R switch 13 is provided for the purpose of preventing radio pulses produced by transmitter 12 from entering receiver 18, and for preventing signals received by antenna 15 from entering transmitter 12.

Cams 29 and 30 are rotated in synchronism with antenna 15. The phase of cams 29 and 30 may be adjusted by knobs 25 and 26 respectively so that when rotating antenna 15 approaches the azimuth of beacon A, cam 29 coacts with cam follower 31 to throw switches 45, 62, and 63 into their "A" positions. The switches are kept in their "A" position while antenna 15 sweeps through a short arc, the center of which has an azimuth approximately that of beacon A. The arc may have a width of about 15°. Similarly when antenna 14 approaches the azimuth of beacon B, cam 30 coacts with follower 31 and causes switches 45, 62, and 63 to be in their "B" position through a short arc of rotation by antenna 15. During the intervals when antenna 15 is not pointed approximately at either beacon A or B, neither cam 20 nor 30 will coact with follower 31, and switches 45, 62, and 63 will be in their neutral position "N."

The reference pulse produced by timer 11 is fed to step delay circuit 40 where it is delayed by one predetermined amount when antenna 15 is pointed at beacon A and by another controlled amount when antenna 15 is pointed at beacon B. The delay for beacon A is set by adjustment of contractor 46 while the delay for beacon B is set by adjustment of contractor 48. In the situation shown in Fig. 1, contactor 46 would be set to give a delay corresponding to AD while contactor 48 would be set to give a delay corresponding to BE.

The delayed reference pulse in the output of circuit 40 is further delayed by range delay circuit 58. The additional delay given by circuit 58 depends upon the control voltage received through line 59, from either memory circuit A or memory circuit B in dependence upon whether antenna 15, is pointed at beacon A or beacon B. The delayed reference pulse in the output of circuit 58 is fed to beacon tracker 60 where its time of arrival is compared with the time of arrival of the response received from the interrogated beacon. If the delayed pulse from circuit 58 arrives at beacon tracker 60 at the same time as the beacon response or index pulse from receiver 18, no error voltage is produced by beacon tracker 60. If the delayed reference pulse arrives before the beacon response, an error voltage of one polarity is produced, said voltage being of a magnitude proportional to the time difference. If the delayed reference pulse arrives at a time after the arrival of the beacon response, a voltage of the opposite polarity is produced, said voltage having a magnitude proportional to the time difference.

If beacon A is being interrogated, the error voltage is applied through operation of switch 62 to memory circuit A. As will be explained presently, memory circuit A produces an output voltage proportional to the range of beacon A. When beacon A is being interrogated, the output voltage of memory circuit A is applied through action of switch 63 and through line 59 to range delay circuit 58. If memory circuit A is producing a voltage correctly proportional to the range of beacon A, the delay given the reference pulse will be such as to cause the reference pulse to appear at beacon tracker 60 in time coincidence with the arrival of the index pulse beacon response and no error voltage will be supplied to change the output of memory circuit A. On the other hand, if the two pulses do not arrive coincidently at beacon tracker 60, a proper error voltage will be produced to correct the range voltage produced by memory circuit A which will in turn correct the range delay in circuit 58.

When beacon B is being interrogated, the action is similar to that described above except that switch 62 applies the error voltage produced by beacon tracker 60 to memory circuit B while switch 63 applies the range voltage from memory circuit B to range delay circuit 58 so that the range pulse has a delay corresponding to the range of beacon B.

The range voltage produced by memory circuit A is compared by meter 65 with the voltage set in potentiometer 67. Meter 65 will thus indicate when the aircraft reaches a certain range with respect to beacon A. Meter 66 similarly indicates when the aircraft reaches a certain range with respect to beacon B. On bombing missions, bomb release mechanism 72 automatically releases the bombs when the aircraft reaches the range preset into potentiometer 71.

The range of the beacon is tracked in the apparatus of Fig. 2 by delaying the reference pulse from timer 11 by an amount corresponding to the range from the aircraft to the beacon. Adjustment of step delay circuit 40 by potentiometers 47 and 49 introduces delays of an amount correspondng to any of the 10 mile range circles shown in Fig. 1. It will be obvious however that the step delay circuit is not necessarily limited to 10 mile steps but may be made adjustable to introduce delays corresponding to any range. In the situation shown in Fig. 1, the step delay circuit 40 introduces delays corresponding to the distances from beacons A and B to range circles 1 and 2 respectively. Range delay circuit 58 introduces delays corresponding to the range from the aircraft P to range circles 1 and 2.

Referring again to Fig. 1, when the cat and mouse method of approach to destination or the bomb release point is used, meter 65 indicating the range to beacon A becomes a pilot direction indicator, the deflection of the needle indicating to the pilot whether or not he is on course, and in which direction he must go to get on course, while meter 66 becomes a distance-to-go meter indicating to the pilot the distance to the bomb release point.

In Fig. 4 is shown a possible circuit for beacon tracker 60 in which the reference pulse from range delay circuit 58 produces in gate generator 80 a square pulse which is fed to coincidence circuit 81 and delay circuit 82 where it is delayed by a slight amount and fed to coincidence circuit 83. Again, gate generator 80 may be a uni-stable multivibrator. In this instance, however, it is preferred that the multivibrator be supplied with a fixed bias voltage. The fixed bias is supplied so that the square voltage pulse produced by the multivibrator will have a constant time width. Delay circuit 82 may be a uni-stable multivibrator or it may be an electrical delay line. The beacon response or index pulse is fed from receiver 18 to coincidence circuits 81 and 83. Coincidence circuits 81 and 83 are arranged so that a pulse appears in the output of these circuits only if the reference pulse and the first pulse of the beacon response appears simultaneously therein. Coincidence circuits 81 and 83 are essentially amplifiers having two signal inputs. In this respect they are somewhat similar to audio frequency mixer circuits. However, they differ from these mixer circuits in that the bias on both signal inputs is great enough to prevent the generation of an output signal unless a signal is present at both signal inputs. Therefore, if the beacon response or index pulse arrives at a time directly between the gate pulse from generator 80 and the delayed gate pulse from circuit 82, equal pulses will be applied to differential error circuit 84 and no error voltage will be generated by the latter circuit. If, however, the beacon response or index pulse occurs at a time more nearly coincident with the gate pulse from generator 80 then a larger pulse will be produced by coincidence circuit 81 than is the case for coincidence circuit 83 and an error voltage of one polarity will be produced. If the beacon response arrives at a time more nearly coincident with the delayed gate pulse from generator 80, then coincidence circuit 83 will produce a larger pulse than will coincidence circuit 81 and an error voltage of opposite polarity will be generated by the latter circuit. Differential error circuit 84 which produces the error voltage is preferably a type of differential amplifier circuit followed by a low pass filter. The low pass filter in effect converts the pulses of error voltage coming from the differential amplifier into a steady or slowly changing error voltage. This steady or slowly changing voltage is essential to the proper operation of range delay circuit 58. The components of the circuit in Fig. 4 are constructed and operate in the manner set forth in the application by Andrew B. Jacobsen, Serial No. 584,233, referred to above.

In the apparatus described above, reliance is placed on the directional qualities of antenna 15 for insurance that the proper beacons are being tracked. If additional insurance is required that the proper beacons are being tracked, the beacon tracking circuit may be arranged to accept responses from beacon A as identified by the known coding of its pulses, when the antenna points toward beacon A, and to accept only pulses from beacon B when the antenna points toward that beacon.

Referring now more particularly to Fig. 5 for a tracking circuit capable of discriminating among coded responses, gate generator 90, coincidence circuits 91 and 93, delay circuit 92, and differential error circuit 94 are constructed and operate in a manner similar to that set forth for components 80, 81, 83, 82, and 84 respectively in Fig. 4. The reference pulse from range delay circuit 58 is also applied to delay circuits 96 and 97. Delay circuits 96 and 97 are provided with ganged switches 98 and 99 respectively, each having left positions "A," right positions "B," and neutral positions "N." In positions "A," switches 98 and 99 make contact with movable contactors 102 and 103 of potentiometers 104 and 105 respectively, said potentiometers being connected between a source of positive potential and ground. In the "B" position, switches 98 and 99 make connections with contactors 106 and 107 of potentiometers 108 and 109 respectively, said potentiometers each being connected between a source of positive potential and ground. Delay circuits 96 and 97 may be any circuits capable of producing a delay in the reference pulse, said delay being of certain magnitudes when switches 98 and 99 are in position "A" and being of other magnitudes when switches 98 and 99 are in position "B," the magnitude of the various delays being adjustable by movement of contactors 102, 103, 106, and 107.

The outputs of delay circuits 96 and 97 are fed to coincidence circuits 112 and 113 respectively. The coincidence circuits 112 and 113 are also supplied with the beacon response from the video circuit of receiver 18 and produce a pulse in their output, when the delayed reference pulse coincides in time with one of the pulses in the coded series of the beacon response. The outputs of coincidence circuits 112 and 113 are applied to connector circuits 114 and 115 respectively. Connector circuits 114 and 115 will allow the differential error voltage from circuit 94 to pass to the memory circuits A or B only when the reference pulse has been properly delayed by circuits 96 and 97 to coincide with the coded series of beacon responses.

When the antenna points toward beacon A, switches 98 and 99 will be shifted by member 33 of Fig. 1, into their A positions and the beacon tracker circuit will then accept only responses coded in accordance with the code of beacon A. When antenna points toward beacon B, switches 98 and 99 will be shifted to the "B" position and beacon tracker 60 will accept only impulses coded in accordance with the code of beacon B.

The components of the circuit in Fig. 5 may be similar in construction and operation to corresponding circuits described in the application by Andrew B. Jacobsen, Serial No. 584,233, referred to above.

Figure 6:
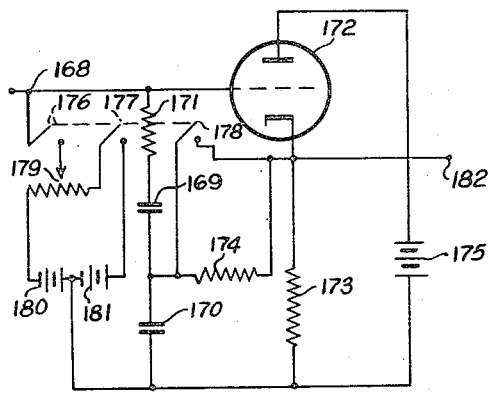
Fig. 6 is a schematic wiring diagram of one form of memory circuit.

Each of memory circuits A and B may be constructed as set forth in Fig. 6. In Fig. 6, the signal or error voltage is applied to terminal 168 and, during the duration of said error voltage, capacitors 169 and 170 charged with the charging current flowing through resistor 171. The charge on capacitor 169, serving as bias for electron tube 172, controls the amount of plate current flowing through this tube and thus the amount of current through resistor 173. When the potential at the end of resistor 173 connected to resistor 174 rises above the charge on capacitor 170, current flows through resistor 174 to increase the charge on capacitor 170. Connected to the plate of tube 172 is shown a source of voltage 175. Switches 176, 177, and 178 are mechanically connected together and represent a single throw triple-pole device which is normally open but when closed permits manual setting of the bias supplied by connector 59 to range delay unit 58 by moving the sliding contact on potentiometer 179 which has connected across its sources of voltage 180 and 181.

The manner in which memory circuits A and B operate may be explained with reference to Fig. 6. The voltage charge across capacitor 169 is proportional to the error voltage. If this is a large voltage, tube 172 conducts more readily and the potential at terminal 182 will rise rapidly. The potential at terminal 182 rises or falls in an exponential manner due to the charge or discharge of capacitor 170. The grid of tube 172 rises with the cathode as the grid is connected to the cathode by resistors 171 and 174 and capacitor 169.

Thus, it will be seen that a positive error voltage applied at terminal 168 will produce an output voltage at terminal 182, said output voltage increasing at a rate depending on the magnitude of the error voltage. A negative error signal at terminal 162 will produce a similarly decreasing output voltage. Said increase or decrease in output voltage will continue for a time which is long compared to the interrogation period.

When switches 176, 177 and 178 are closed, resistor 174 is shorted and it is possible to control the voltage at terminal 182 by regulating potentiometer 179. Switch 177 prevents power losses from sources 180 and 181 when potentiometer 179 is not being used.

The output of memory circuits A and B are applied as bias to range delay unit by means of switch 63.

Memory circuits A and B each produce a voltage bias indicative of the range to a corresponding fixed beacon. This range voltage is initially set or stored in the circuit by the manual operation described above in locating the beacon and therefore varies in accordance with the error voltage generated by unit 60. If the beacon is interrogated intermittently, memory circuit 23 develops a voltage between the replies, said voltage being indicative of the range determined by the last reply.

Referring to Fig. 6, the rate at which capacitor 170 changes its charge is proportional to the velocity of the moving interrogator with respect to the beacon. The time constant of the circuit containing capacitor 170 is approximately equal or larger than the longest time interval between successive appearances of the video signal permitting capacitor 170 to change its voltage; thus, changing the bias on range delay unit 58 in relation to the rate of change of the distance between the interrogator and the fixed beacon which results in velocity memory. If the rate of change of the distance between interrogator and the beacon remains constant, the memory circuit will anticipate the change in distance between successive interrogations and position the reference pulse so that it is coincident with the received reply or index pulse.

Referring to Fig. 6, it will be noted that when switches 176, 177 and 178 are closed the voltage at terminal 182 may be controlled manually to adjust the delay of unit 58 to position the reference pulse output of 58 at coincidence with the received pulses, thus permitting a particular beacon to be searched for and, after finding the beacon, the opening of switches 176, 177, and 178 will permit the beacon to be tracked automatically.

From the description given above, it will be clear that in accordance with the present invention, there is provided a navigation system for continuously determining the location of a mobile craft relative to a plurality of fixed stations located at known positions comprising means for establishing communication periodically between the craft and each of these stations.

Also there is provided the means, timer 11 for producing at the craft a timing and a reference pulse recurrent at a chosen repetition rate and means, receiver 18, responsive to the communication with a particular one of these stations for producing an index pulse having a time delay relative to the reference pulse which corresponds to the distance of the craft from the particular station.

Also, there is provided a first means, the step delay unit 40, for delaying the reference pulse by an amount corresponding to a chosen major part of the distance comprising a potential supplied by either potentiometer 47 or 48, which represents a measure of the major part of the referred to distance. A second means, range delay unit 58, is provided for additionally delaying the reference pulse, the purpose of which is to establish coincidence of the reference and the index pulses and is comprised of a bias or range potential which represents a measure of the remaining part of the distance.

A comparison circuit, the beacon tracker 60, is provided for producing an error potential proportional to the deviation from the aforementioned coincidence which results from travel of the craft.

Also, there is provided a memory circuit, the memory circuit A or B, comprising means for storing the range potential. This memory circuit also includes means responsive to the error signal for adjusting the stored range potential in correspondence with the rate of change of the range.

Also there is provided means, the potentiometer 67 or potentiometer 71, for establishing a potential representing a desired range for the particular station and means, the meter 65 or 66, for indicating the difference between the measured and desired range.

While there has been described what is at present considered to be the preferred embodiment of this invention, it will be obvious to those skilled in the art that various changes and modifications may be made therein without departing from the scope of the invention as set forth in the appended claims.

The invention claimed is:

1. In a radio navigation system means for transmitting electromagnetic energy pulses and for receiving signals from each of a plurality of remote sources responsive to said transmitted pulses, means for generating a reference pulse each time a pulse is transmitted, first predicting means providing a voltage the amplitude of which is proportional to the anticipated time interval between the time of occurrence of said reference pulses and the time that signals from a first remote source are received, second predicting means providing a voltage proportional to the anticipated time interval between the time of occurrence of said reference pulses and the time signals from a second remote source are received, delay means responsive to said predicting means for delaying said reference pulses, first switch means having at least two operative positions, said switch means connecting said first predicting means to said delay means when in a first operative position and connecting said second predicting means to said delay means when in a second operative position, a comparison circuit responsive to said delayed reference pulses and signals from said remote sources, said comparison circuit providing an error signal proportional to the time interval between the time of occurrence of said delayed reference pulse and the time that said signals are received, second switch means having at least two operative positions, said second switch means connecting said comparison circuit to said first predicting means when in a first operative position and to said second predicting means when in a second operative position; and means for causing said first and second switch means to be in said first operative positions when signals from said first source are being received and in said second operative position when signals from said second source are being received whereby the signal from said comparison means controls the output of said predicting means so that errors, if any, between said anticipated time intervals and the actual time intervals between the time of occurrence of said reference pulses and the time said signals are received from said remote sources are substantially eliminated.

2. Apparatus as claimed in claim 1 wherein said comparison circuit includes means for rejecting received signals not having a predetermined code.

3. Apparatus as claimed in claim 1 said apparatus further comprising means for establishing a first fixed reference voltage, means for comparing the output of said first predicting means with said first reference voltage and indicating the difference in amplitude if any therebetween, means for estabishing a second fixed reference voltage, and means for comparing the output of said second predicting means and indicating the difference, if any, therebetween.

4. A system for tracking a plurality of signals received in response to a transmitted signal comprising means for generating a reference pulse, delay means responsive to an input bias voltage for delaying said reference pulse, a comparison circuit for generating an error voltage proportional to the time spacing between said delayed reference pulse and a received signal, a plurality of signal storage means, a first switch means having a plurality of operative positions, each of said positions selectively connecting said comparison circuit to one of said signal storage means, a second switch means having a plurality of operative positions, each of said operative positions connecting said delay means to one of said signal storage means and means for causing said first and second switch means to assume predetermined operative positions as each signal is being received whereby the output of said signal storage means acts as the input bias voltage to said delay means and said error signal causes the output of said signal from said signal storage means to change in a direction that will reduce the amplitude of said error signal, the output signal from each of said storage means thereby providing a measure of the time interval between the time a pulse is transmitted and the time a particular signal is received.

5. Apparatus as claimed in claim 4 wherein said delay means comprises two serially connected delay circuits, one of said circuits being responsive to the bias voltage supplied from said storage means and the other of said delay circuits being responsive to a second input bias voltage, said apparatus further comprising a plurality of adjustable bias sources, a third switch means having a plurality of operative positions, each of said positions connecting said other delay circuit to one of said adjustable bias sources, and means for operating said third switch means in synchronism with said first and second switch means.

6. In a range tracking system wherein signals from a plurality of sources are intermittently received, and wherein said range tracking system comprises means for generating energy representing a characteristic of each of said signals, and means for storing said energy, means for simultaneously tracking a plurality of signals comprising a plurality of said storage means and switch means for connecting a different storage means to said generating means each time a different signal is received, each of said storage means thereby storing data relative to only one of said sources.

7. A navigation system for continuously determining the location of a mobile craft relative to a plurality of fixed stations located at known positions comprising means for establishing communication cyclically between said craft and each of said stations, means for producing at said craft a timing and a reference pulse recurrent at a chosen repetition rate, means responsive in turn to the communication with each one of said stations for producing in turn an index pulse having a time delay relative to said reference pulse which corresponds in turn to the distance of said craft from each of said stations, a first means for cyclically delaying said reference pulse by an amount which in turn corresponds to a chosen major part of said distance from each of said stations comprising a plurality of potentials which represent in each case the measure of said major part, a second means for additionally delaying said reference pulse by an amount which corresponds in each case to the remaining part of said range, to establish coincidence of said reference and said index pulses, comprising a bias or range potential which represents a measure of the remaining part of said range, a comparison circuit for producing an error potential proportional to the deviation from coincidence which results from travel of said craft, a corresponding plurality of memory circuits comprising means for storing said range potentials which represent the range of each of said stations and means responsive to said error signal for adjusting each of said stored range potentials in correspondence with the rate of change of said range, means for establishing a corresponding plurality of potentials, each representing the desired remaining part of said range and means for indicating in each case the difference between said measured and said desired range.

8. A navigation system for continuously determining the location of a mobile craft relative to a plurality of fixed stations located at known positions comprising, means for establishing communication periodically between said craft and each of said stations, means for producing at said craft a timing and a reference pulse recurrent at a chosen repetition rate, means responsive to the communication with a particular one of said stations for producing an index pulse having a time delay relative to said reference pulse which corresponds to the distance of said craft from said station, a first means for delaying said reference pulse by an amount corresponding to a chosen major part of said distance comprising a potential which represents a measure of said major part, a second means for additionally delaying said reference pulse to establish coincidence of said reference and said index pulses, comprising a bias or range potential which represents a measure of the remaining part of said distance, a comparison circuit for producing an error potential proportional to the deviation from said coincidence which results from travel of said craft, a memory circuit comprising means for storing said range potential, means responsive to said error signal for adjusting said stored range potential in correspondence with the rate of change of said range, means for establishing a potential representing a desired range for said particular station and means for indicating the difference between said measured and said desired range.

9. A navigation system for continuously determining the location of a mobile craft relative to a plurality of fixed stations located at known positions comprising, means for establishing communication periodically between said craft and each of said stations, means for producing at said craft a timing and a reference pulse recurrent at a chosen repetition rate, means responsive to the communication with a particular one of said stations for producing an index pulse having a time delay relative to said reference pulse which corresponds to the range of said craft from said station, means for delaying said reference pulse by an amount which corresponds to said range, to establish coincidence of said reference and said index pulses, comprising a bias or range potential which represents a measure of said range, a comparison circuit for producing an error potential proportional to the deviation from coincidence which results from travel of said craft, a memory circuit comprising means for storing said range potential, means responsive to said error signal for adjusting said stored range potential in correspondence with the rate of change of said range, means for establishing a potential representing a desired range for said particular station and means for indicating the difference between said measured and said desired range.

10. A navigation system for continuously determining the location of a mobile craft relative to a plurality of fixed stations located at known positions comprising, means for establishing communication periodically between said craft and each of said stations, means for producing at said craft a timing and a reference pulse recurrent at a chosen repetition rate, means responsive to the communication with a particular one of said stations for producing an index pulse having a time delay relative to said reference pulse which corresponds to the range of said craft from said station, means for delaying said reference pulse by an amount which corresponds to said range, to establish coincidence of said reference and said index pulses, comprising a bias or range potential which represents a measure of said range, a comparison circuit for producing an error potential proportional to the deviation from coincidence which results from travel of said craft, a memory circuit comprising means for storing said range potential, means responsive to said error signal for adjusting said stored range potential in correspondence with the rate of change of said range.

BRITTON CHANCE.

REFERENCES CITED

The following references are of record in the file of this patent:

UNITED STATES PATENTS

| Number | Name | Date |
|---|---|---|
| 2,252,083 | Luck | Aug. 12, 1941 |
| 2,307,029 | Elm | Jan. 5, 1943 |